United States Patent [19]

Rionda et al.

[11] Patent Number: 4,561,230
[45] Date of Patent: Dec. 31, 1985

[54] TRUSS ASSEMBLY AND TRUSS HANGER AND CONNECTOR HANGER FOR USE WITH TRUSSES

[75] Inventors: Carlos S. Rionda; Joaquin J. Palacio, both of Miami, Fla.

[73] Assignee: Gang-Nail Systems, Inc., Miami, Fla.

[21] Appl. No.: 424,216

[22] Filed: Sep. 27, 1982

[51] Int. Cl.⁴ .............................................. F16B 5/00
[52] U.S. Cl. ........................................ 52/289; 52/712;
52/DIG. 6; 52/693; 403/232.1
[58] Field of Search .................. 52/DIG. 6, 693, 289,
52/712, 702, 643, 665; 411/461–464, 466–468;
403/232.1, 405, 283

[56] References Cited

U.S. PATENT DOCUMENTS

| | | | |
|---|---|---|---|
| 666,918 | 1/1901 | Butz | 403/232.1 |
| 2,911,690 | 11/1959 | Sanford | 403/232.1 |
| 3,365,222 | 1/1968 | Polyak | 52/712 |
| 3,961,455 | 6/1976 | Peters | 52/693 |
| 3,989,398 | 11/1976 | Wendt | 403/232.1 |
| 4,198,175 | 4/1980 | Knepp | 403/232.1 |
| 4,297,048 | 10/1981 | Jureit | 411/466 |

FOREIGN PATENT DOCUMENTS 46-8708 7/1972 Australia ............................... 52/702

Primary Examiner—Donald G. Kelly
Assistant Examiner—Kathryn Ford
Attorney, Agent, or Firm—LeBlanc, Nolan, Shur & Nies

[57] ABSTRACT

A truss and beam assembly and a truss hanger and connector for use with wooden trusses and beams is disclosed. The truss hanger is used for attaching a truss assembly to a beam extending transversely to the longitudinal axis of the truss.

3 Claims, 5 Drawing Figures

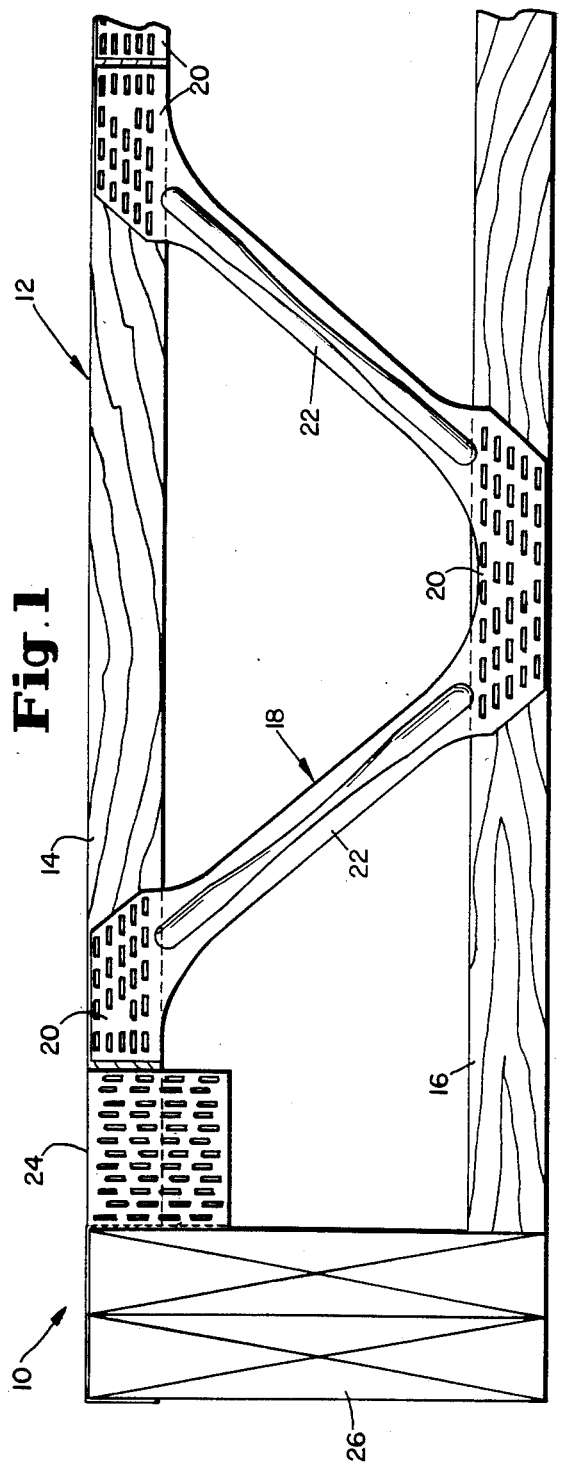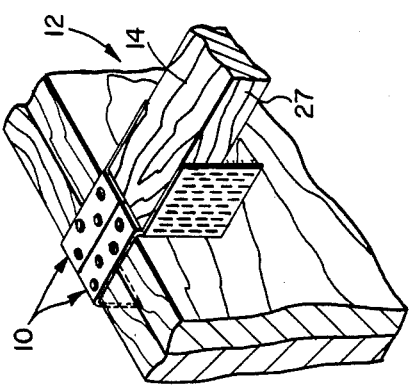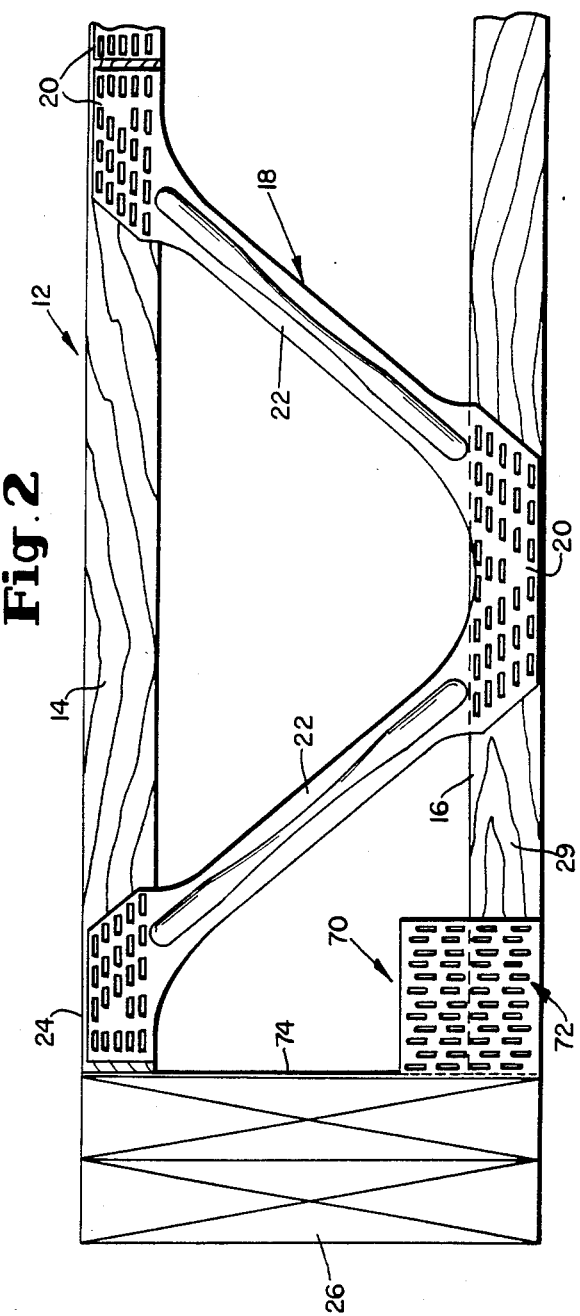

TRUSS ASSEMBLY AND TRUSS HANGER AND CONNECTOR HANGER FOR USE WITH TRUSSES

CROSS REFERENCE TO RELATED APPLICATIONS

U.S. patent application Ser. No. 423,169 entitled "Truss Assembly and Truss Hanger for Use with Trusses" filed on Sept. 24, 1982 now U.S. Pat. No. 4,455,805 which names Carlos S. Rionda and Joaquim Jack Palacio as the inventors and which is assigned to the assignee of the present invention discloses a truss hanger which may be used for attaching trusses to wooden beams running transverse to the longitudinal axis of the truss. This application is incorporated herein by reference.

BACKGROUND OF THE INVENTION

The present invention relates to wooden trusses used for supporting structural loads and to hardware used in constructing wooden trusses which enhances the ease of installation and increases the resultant structural rigidity of the installed trusses for bearing structural loads.

DESCRIPTION OF THE PRIOR ART

In constructing various types of wooden truss assemblies, including both roof trusses and floor joists, it has been common to use large wooden structural members such as 2"×10"s. Such large wooden members, however, are becoming increasingly difficult to obtain and have increased in cost substantially. Consequently, various alternatives have been sought for enabling the construction of trusses which are able to bear the structural loads of full dimension lumber but which are constructed from smaller pieces of dimension lumber such as 2"×4" members which are spaced apart by metal connectors.

Substitutes for full dimension lumber roof trusses and floor joists must satisfy two primary criteria. First, the trusses must be able to withstand large compressive loads so that they may be used for bearing substantial structural loads. Second, it is desirable that the trusses be prefabricated at a manufacturing plant at a low labor cost and shipped to a building site without a high degree of risk of incurring damage to the trusses.

Various types of hardware have been developed for making prefabricated trusses. U.S. Pat. Nos. 3,025,577 to Jureit, 3,298,151 to Jureit, and 4,078,352 to Knowles, and U.S. patent application Ser. No. 337,671 now U.S. Pat. No. 4,485,606 entitled "Truss Structures Constructed with Metal Web Members" filed on Jan. 7, 1982 which names Robert Gottlieb as the inventor and which is assigned to assignee of the present invention discloses the preferred type of metal connector to be used in fabricating truss assemblies in conjunction with the truss hanger and connector hanger of the present invention.

Trusses have been installed at the building site in a number of ways. If the trusses are being used to construct a floor, they may be laid on top of the foundation walls and nailed into a beam which extends perpendicular to the longitudinal axis of the trusses. Trusses have been nailed in place by toenailing through various surfaces of the wood at the end of the truss.

SUMMARY OF THE INVENTION

It is an object of the invention to provide a hanger for attaching trusses to beams running transverse to the longitudinal axis of the trusses which does not require the extensive use of the attachment elements through the wooden members of the individual trusses.

The hanger for trusses provides a mechanism for attaching the trusses fixedly to a beam running perpendicular to the longitudinal axis of the individual trusses which eliminates the need for using toenailing or types of connection mechanisms which require the extensive use of fasteners. Normally, a pair of "left and right" hangers is attached to both ends of each truss to provide a bracket which may be laid over the top of the beam and fastened to the beam without the use of extensive labor.

The hanger for trusses provides a mechanism for fixedly attaching the ends of a truss directly to a beam running transverse to the longitudinal axes of the truss by means of nailing a strap directly to the surface of the beam.

A hanger for trusses in accordance with the invention includes a bracket having a first leg disposed in a first plane with first and second ends and two outside edges running between the first and second ends, the first leg having a side which is adapted to engage the width of beam, a base, disposed in a second plane, having first and second ends, the first end of the base being attached to the first end of the leg at approximately a 90° angle, the base being adapted to engage the top of the beam, a second leg, disposed in a third plane which is parallel to the second plane, and is attached to the second end of the base at an approximate 90° angle, the second leg being adapted to engage a second side of the beam across its width; and a connecting plate disposed in a fourth plane, the connecting plate being attached to the first leg along one of outside edges, the fourth plane being substantially perpendicular to the first plane, the connecting plate having a plurality of sharp projections extending generally perpendicular from the connecting plate toward the other outside edge. The hanger further includes at least one aperture in the base and second leg which is adapted to receive nails for attaching the beam to the bracket.

A connector hanger in accordance with the invention includes a connecting plate having a plurality of sharp projections extending generally perpendicular from the connecting plate, the connecting plate being disposed in a first plane and having a plurality of outside edges; a strap disposed in a second plane which is joined to one of the outside edge of the connecting plate, the second plane being substantially perpendicular to the first plane, the strap having a plurality of apertures adapted for receiving nails and extending the entire length of the edge of the connecting plate to which the strap is joined and projecting past the connecting to provide a surface for nailing the strap to a wooden member; the strap being rectangular in shape and being joined to the connecting plate along one of its two longest sides with the end of the longest side being coterminous with the end of the outside edge of the connecting plate to which the strap is attached and the sharp projections extending toward the other of the two longest sides.

BRIEF DESCRIPTION OF THE DRAWINGS

FIG. 1 is an end view of a truss hanger in accordance with the invention which is used for attaching truss to a beam running transverse to the longitudinal axis of the truss.

FIG. 2 is an end view of a connector hanger in accordance with the invention which is used for attaching a truss to a beam running transverse to the longitudinal axis of the truss.

FIG. 3 is an isometric view illustrating the preferred use of left and right hand truss hangers of the type illustrated in FIG. 1 to attach a truss to a transverse beam.

DESCRIPTION OF THE PREFERRED EMBODIMENTS

Figure 4:
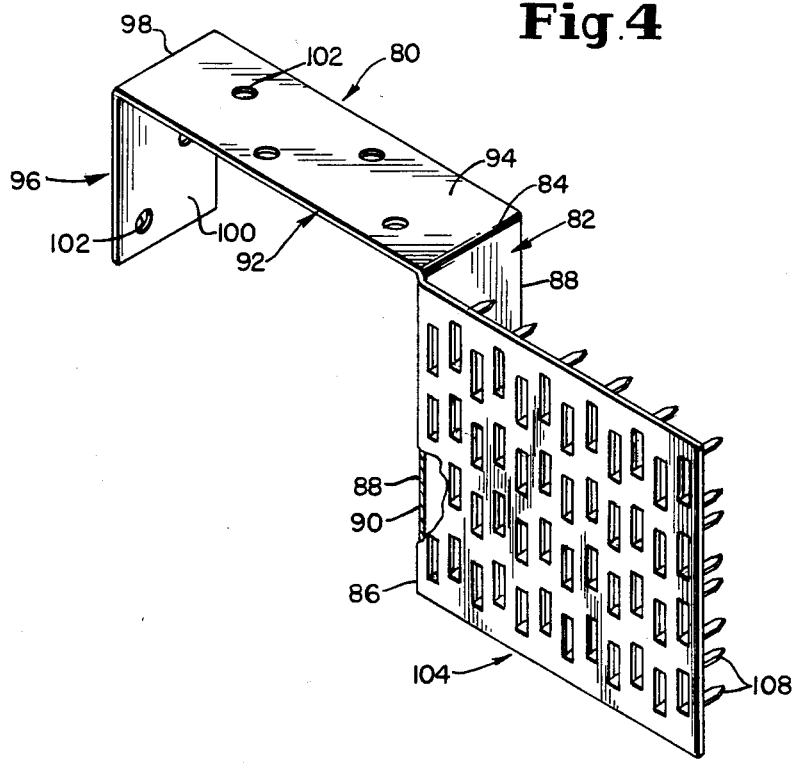
FIG. 4 is an isometric view of the truss hanger of FIG. 1 and 3.

FIG. 1 illustrates an end view of a truss assembly which uses a hanger 10 in accordance with the invention. The truss 12 has an upper wooden member 14 and a lower wooden member 16 which may be made from standard dimension lumber such as a 2"×4" which is turned on its side so that the width of each 2"×4" within the truss is parallel to the horizontal. The upper wooden member 14 and the lower wooden member 16 are fixedly attached to a plurality of metal web members 18 which may be of any known construction but which preferably are those which are described in the aforementioned U.S. patent application Ser. No. 337,671. Each of the metal web members 18 has three connecting plates 20 which have a plurality of sharp teethlike projections which are pressed into the wooden members 14 and 16 to completely embed the projections into the wood to securely attach the metal web member into the upper and lower wooden members. While the design of the sharp teeth like projections is not part of the present invention, preferably they are manufactured in accordance with the teachings of U.S. Pat. No. 4,343,580 which is owned by the assignee of the present invention. A pair of intermediate sections 22 connects the connecting plate 20 at the vertex with the connecting plates at the ends. Each truss 12 is supported at its ends 24 by a pair of truss end supporting beams 26 which run transverse to the longitudinal axis of the trusses. While it is common practice to support trusses with wooden beams in modern construction, it should be clearly understood that the truss hanger is not limited to the use of wooden truss end supporting beams and in fact may be used with any truss end supporting structure having a rectilinear cross-section. The truss hanger 10 is used to attach the truss 12 to the truss end supporting beam 26. The truss hanger is described in detail infra in conjunction with FIG. 4.

FIG. 2 illustrates an end view of a truss having a construction identical to that described supra in FIG. 1 except that a connector hanger 70 is used to attach the truss 12 to the truss end supporting beams 26 instead of the truss hanger 10 of FIG. 1. Identical parts in FIGS. 1 and 2 are identified by like reference numerals. The connector hanger 70 has a connecting plate 72 having a plurality of teeth like projections which are embedded in the lower wooden member 16 and a strap 74 which is nailed into the truss end supporting beam 26. The connector hanger 70 is described in detail infra in conjunction with FIG. 5. The connector hanger 70 is an alternative to the hanger 10 for attaching a truss 12 to a truss end supporting beam 26.

FIG. 3 illustrates the preferred form of using hangers 10 in accordance with the invention. A pair of "left and right" hangers 10 are attached to both sides 27 of the upper wooden member 14. In a like manner, the connector hanger 70 is preferably attached to both sides 29 of the lower wooden member 16. Only one side 29 is illustrated FIG. 3.

FIG. 4 illustrates an isometric view of a truss hanger 10 in accordance with the invention. The truss hanger 10 has a bracket 80 having a first leg 82 disposed in a first plane with a first end 84 and a second end 86 and two outside edges 88 running between the first and second ends. The first leg 82 has a side 90 which is adapted to engage the width of a truss end supporting beam 26 (FIG. 1). A base 92, which is disposed in a second plane substantially perpendicular to the first plane, is attached to the first leg 82. The first end 84 of the first leg 82 is joined to the base 92 at the first end 94 of the base. The base is adapted to engage the top of the truss end supporting beam 26 (FIG. 1). A second leg 96, disposed in a third plane, is joined to the second end 98 of the base 92 at a substantially 90° angle. The second leg 98 has a surface 100 which is adapted to engage the second side of the truss end supporting beam. The base 92 and second leg 98 has a plurality of apertures 102 which are adapted for receiving nails for securing the truss hanger 10 to the truss end supporting beam 26. A connecting plate 104, which is disposed in a fourth plane, is joined to the first leg 82. The connecting plate 104 is joined along one of its outside edges 106 to one of the outside edges 88 of the first leg 82. The fourth plane forms an approximate 90° angle with the first plane. The connecting plate 104 as a plurality of teeth-like projections 108 which extend substantially perpendicular from the fourth plane toward the remaining edge 88. While the truss hanger 10 is preferably used for attaching trusses to truss end supporting beams 26, it should be clearly understood that its use to attach trusses to truss end supporting beams is not a limitation to its field of use.

Figure 5:
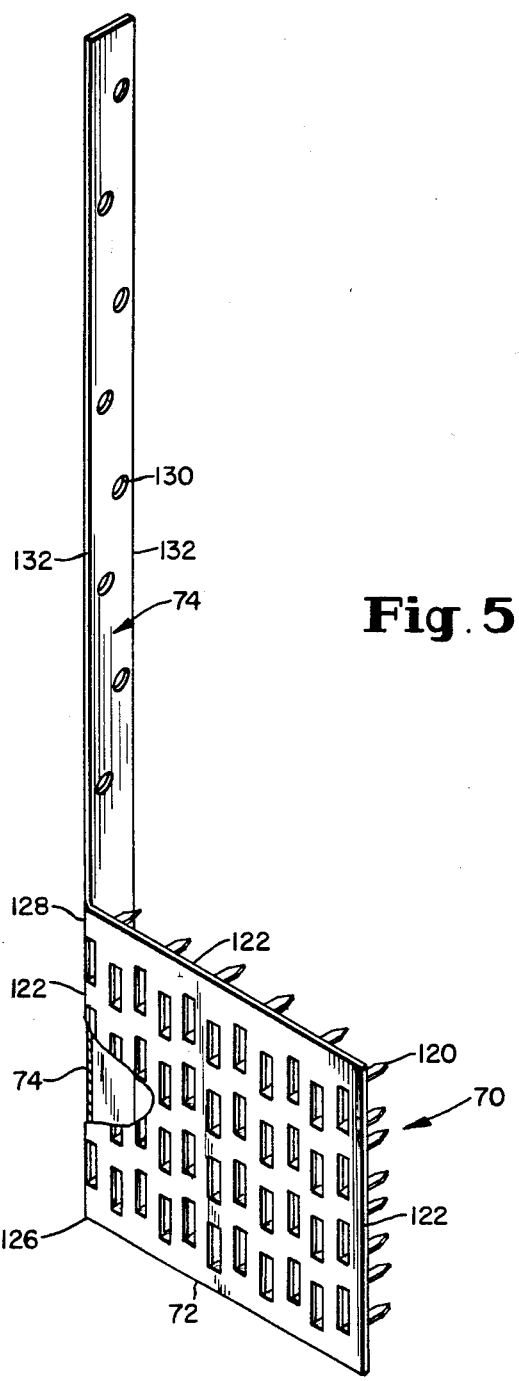
FIG. 5 is an isometric view of a connector hanger of FIG. 2.

FIG. 5 illustrates an isometric view of a connector hanger 70 in accordance with the invention. The connecting plate 72 has a plurality of sharp teeth like projections 120 extending generally perpendicular from the plane of the connecting plate. The connecting plate 72 is preferably rectilinear in shape and has four outside edges 122. A strap 74 is joined to one of the outside edges 122. The strap is disposed in a second plate which orthogonal to the first plane. The strap 124 extends from the first end 126 of the outside edge 122 to which it is attached completely along the outside edge past the other end 128 of the outside edge. The amount of extension of the strap 124 past the end 128 is not critical and generally should in combination with the connecting plate equal the width of the truss 12 (FIG. 1). The strap 124 has a plurality of apertures 130 which are adapted for receiving nails for securing the strap to the truss end supporting beam 26 (FIG. 1). The strap is preferably rectilinear in shape with one of the two longest sides 132 being joined to the connecting plate 72 as previously described. The sharp teeth like projections 121 project from the plane of the connecting plate 72 toward the other longest side 132 to which the connecting plate is not joined.

While the invention has been described in terms of its preferred embodiments, it should clearly be understood that numerous modifications may be made to the invention without departing from its spirit and scope as defined in the appended claims.

What is claimed is:

1. A wooden truss having a pair of ends which are attached to respective beams extending transverse to the longitudinal axis of the truss comprising:
   (a) a pair of spaced apart wooden members, said pair of wooden members forming upper and lower members and being held in their spaced apart position by a plurality of means attached to the wooden members;
   (b) a pair of truss hangers fixedly connecting one end of said truss structure to one of said beams, said pair of truss hangers being of like construction but of mirror image configuration, each truss hanger comprising:
      (i) a bracket having a first leg disposed in a first plane with first and second ends and two outside edges running between the first and second ends, the first leg having a side which is adapted to engage the width of a beam, a base disposed in a second plane and having first and second ends, the first end of the base being attached to the first end of the first leg at approximately a 90° angle, the base being adapted to engage the top of the beam, and a second leg disposed in a third plane which is substantially parallel to the first plane and which is attached to the second end of the base at an approximate 90° angle, the second leg being adapted to engage a second side of the beam across its width;
      (ii) a connecting plate having upper and lower end portions and being disposed in a fourth plane, the connecting plate being attached to the first leg along one of the outside edges of said first leg and with the upper end of the connecting plate being at the same level as the base of said bracket, the fourth plane being substantially perpendicular to the first plane, the connecting plate having a plurality of teeth-like projections extending generally perpendicular from the connecting plate in a direction so as to overlie said first leg, with said projections attached to a side of the upper wooden member of the truss; and
      (iii) at least one of the base and the second leg having at least one aperture which is adapted to receive nails or like fasteners for attaching the bracket to the beam;
   said connecting plate being positioned with respect to said truss so that the first leg of the bracket is positioned between the truss and the respective beam.

2. A wooden truss having a pair of ends which are adapted to be attached to respective beams extending transverse to the longitudinal axis of the truss comprising:
   (a) a pair of spaced apart wooden members, said pair of wooden members forming upper and lower members and being held in their spaced apart position by a plurality of means attached to the wooden members;
   (b) at least one connector hanger disposed at each end of the truss, each connector hanger comprising:
      (i) a connecting plate having a plurality of teeth-like projections extending generally perpendicular from the connecting plate, the connecting plate being disposed in a first plane and having a plurality of outside edges;
      (ii) a strap disposed in a second plane and being joined to an outside edge of the connecting plate, the second plane being substantially perpendicular to the first plane, the strap extending the entire length of the edge of the connecting plate to which the strap is joined and also extending substantially beyond the connecting plate to provide a surface for nailing the strap to a wooden member, the extension of the strap beyond the connecting plate in combination with the edge of the connecting plate to which the strap is joined being substantially equal to the width of the truss extending from the bottom of the lower member to the top of the upper member of the truss, and with the strap having a plurality of apertures adapted for receiving nails or like fasteners; and
      (iii) the strap being rectangular in shape, and being joined to the connecting plate along one of the two longest sides of the strap with the end of the longest side to which the strap is connected being coterminous with the end of the outside edge of the connecting plate to which the strap is attached and with the teeth-like projections extending in a direction so as to overlie said strap, with said projections attached to a side of the lower wooden member of the truss;
   said connecting plate being positioned with respect to said truss so that the strap is positioned between the truss and the respective beam.

3. A truss and beams in accordance with claim 2 wherein each end of the truss has a pair of truss hangers which are of like construction but mirror image configuration and which have their respective connecting plates fixedly attached to different sides of the lower wooden member of the truss.

* * * * *